United States Patent
Hunter

(10) Patent No.: US 9,015,610 B2
(45) Date of Patent: Apr. 21, 2015

(54) DISPLAY OF CONTROLLABLE ATTRIBUTES FOR A CONTROLLABLE ITEM BASED ON CONTEXT

(75) Inventor: Jim Hunter, Sunnyvale, CA (US)

(73) Assignee: General Instrument Corporation, Horsham, PA (US)

( * ) Notice: Subject to any disclaimer, the term of this patent is extended or adjusted under 35 U.S.C. 154(b) by 161 days.

(21) Appl. No.: 13/277,258

(22) Filed: Oct. 20, 2011

(65) Prior Publication Data

US 2012/0124501 A1    May 17, 2012

Related U.S. Application Data

(60) Provisional application No. 61/414,202, filed on Nov. 16, 2010.

(51) Int. Cl.
    *G06F 3/048*     (2013.01)
    *H04M 1/725*     (2006.01)
    *G06F 3/0482*     (2013.01)
    *G06F 3/0484*     (2013.01)
    *G06F 3/0489*     (2013.01)

(52) U.S. Cl.
    CPC ......... *H04M 1/72533* (2013.01); *G06F 3/0482* (2013.01); *G06F 3/04847* (2013.01); *G06F 3/04892* (2013.01); *H04M 1/72569* (2013.01); *H04M 2250/22* (2013.01)

(58) Field of Classification Search
    USPC .......................................................... 715/767
    See application file for complete search history.

(56) References Cited

U.S. PATENT DOCUMENTS

| | | | |
|---|---|---|---|
| 7,155,213 B1 | 12/2006 | Almeda et al. | |
| 8,117,542 B2* | 2/2012 | Radtke et al. | 715/708 |
| 8,271,575 B2* | 9/2012 | Hunter | 709/201 |
| 2006/0036945 A1* | 2/2006 | Radtke et al. | 715/708 |
| 2009/0083663 A1* | 3/2009 | Kim | 715/811 |
| 2009/0234923 A1* | 9/2009 | Hunter | 709/206 |
| 2010/0023865 A1 | 1/2010 | Fulker et al. | |
| 2010/0138764 A1* | 6/2010 | Hatambeiki et al. | 715/765 |
| 2010/0271312 A1* | 10/2010 | Alameh et al. | 345/173 |
| 2011/0289437 A1* | 11/2011 | Yuen et al. | 715/762 |

FOREIGN PATENT DOCUMENTS

| | | |
|---|---|---|
| WO | 2008/039537 A2 | 4/2008 |
| WO | 2008039537 A2 | 4/2008 |

OTHER PUBLICATIONS

PCT Search Report and Written Opinion, RE: Application #PCT/US2011/057457; Feb. 15, 2012.

(Continued)

*Primary Examiner* — William Bashore
*Assistant Examiner* — Henry Orr
(74) *Attorney, Agent, or Firm* — Thomas A. Ward

(57) ABSTRACT

In one embodiment, a method includes determining focus on a focus item associated with a controllable item. The focus item is displayed on an interface that includes a plurality of display positions. A context for the controllable item based on the focus being on the focus item and a set of controllable attributes associated with the controllable item are determined. The method dynamically determines an order of the set of controllable attributes based on the context. The context is used to prioritize the set of controllable attributes in the order. The set of controllable attributes is displayed in the order in at least a portion of the plurality of display positions.

5 Claims, 6 Drawing Sheets

(56) References Cited

OTHER PUBLICATIONS

PCT Search Report & Written Opinion, RE: Application #PCT/US2011/057457; Feb. 15, 2012.

Office Action, RE: Canadian Patent Application #2,823,470, dated May 29, 2014.

Office Action, RE: Korean Patent Application #10-2013-7015283 (English translation); dated Mar. 31, 2014.

\* cited by examiner

DISPLAY OF CONTROLLABLE ATTRIBUTES FOR A CONTROLLABLE ITEM BASED ON CONTEXT

CROSS REFERENCE TO RELATED APPLICATIONS

The present application claims priority to U.S. Provisional App. No. 61/414,202 for "Controllable Device Options Presented Base Upon Contextual Value" filed Nov. 16, 2010, the contents of which is incorporated herein by reference in their entirety.

BACKGROUND

Particular embodiments generally relate to item control.

User interfaces typically represent a set of controls in pre-set arrangements. For example, when a user opens an application, such as a music player, a set of controls, such as "play", "pause", "stop", etc., are displayed. The layout of the set of controls is pre-set for the application. For example, when a user decides to play a song, the controls remain in the same positions. Also, when the playing of the song is stopped using the stop control, the controls remain in the same positions. This allows a user to become familiar with the positioning of the controls. Also, when a user opens a second application, such as a phone application, the user is shown a keyboard with other call options (e.g., dial, hang-up, etc.) in a pre-set arrangement. These set of commands are different from the music player controls, but still remain are in a pre-set order when different controls are selected for the music player. Control arrangements may change when certain controls are selected. For example, when a user makes a phone call, a new interface with different controls is displayed. The controls that are displayed are typically hard coded for an application and do not change.

In some systems, navigation between controls in the set of controls requires input keystrokes. For example, the "arrow" keys are used to navigate in the up, down, right, and left directions. Although keeping the same arrangement for the set of controls allows a user to become familiar with the positioning of the controls, if navigating to a control requires many keystrokes, the navigation may become tedious for a user.

SUMMARY

In one embodiment, a method includes determining focus on a focus item associated with a controllable item. The focus item is displayed on an interface that includes a plurality of display positions. A context for the controllable item based on the focus being on the focus item and a set of controllable attributes associated with the controllable item are determined. The method dynamically determines an order of the set of controllable attributes based on the context. The context is used to prioritize the set of controllable attributes in the order. The set of controllable attributes is displayed in the order in at least a portion of the plurality of display positions.

In one embodiment, a non-transitory computer-readable storage medium is provided containing instructions for controlling a computer system to be operable to: determine focus on a focus item associated with a controllable item, the focus item being displayed on an interface that includes a plurality of display positions; determine a context for the controllable item based on the focus being on the focus item; determine a set of controllable attributes associated with the controllable item; dynamically determine an order of the set of controllable attributes based on the context, wherein the context is used to prioritize the set of controllable attributes in the order; and display the set of controllable attributes in the order in at least a portion of the plurality of display positions.

In one embodiment, an apparatus includes one or more computer processors and a computer-readable storage medium. The computer-readable medium comprising instructions for controlling the one or more computer processors to be operable to: determine focus on a focus item associated with a controllable item, the focus item being displayed on an interface that includes a plurality of display positions; determine a context for the controllable item based on the focus being on the focus item; determine a set of controllable attributes associated with the controllable item; dynamically determine an order of the set of controllable attributes based on the context, wherein the context is used to prioritize the set of controllable attributes in the order; and display the set of controllable attributes in the order in at least a portion of the plurality of display positions.

The following detailed description and accompanying drawings provide a more detailed understanding of the nature and advantages of the present invention.

DETAILED DESCRIPTION

Described herein are techniques for a system to display controllable attributes. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
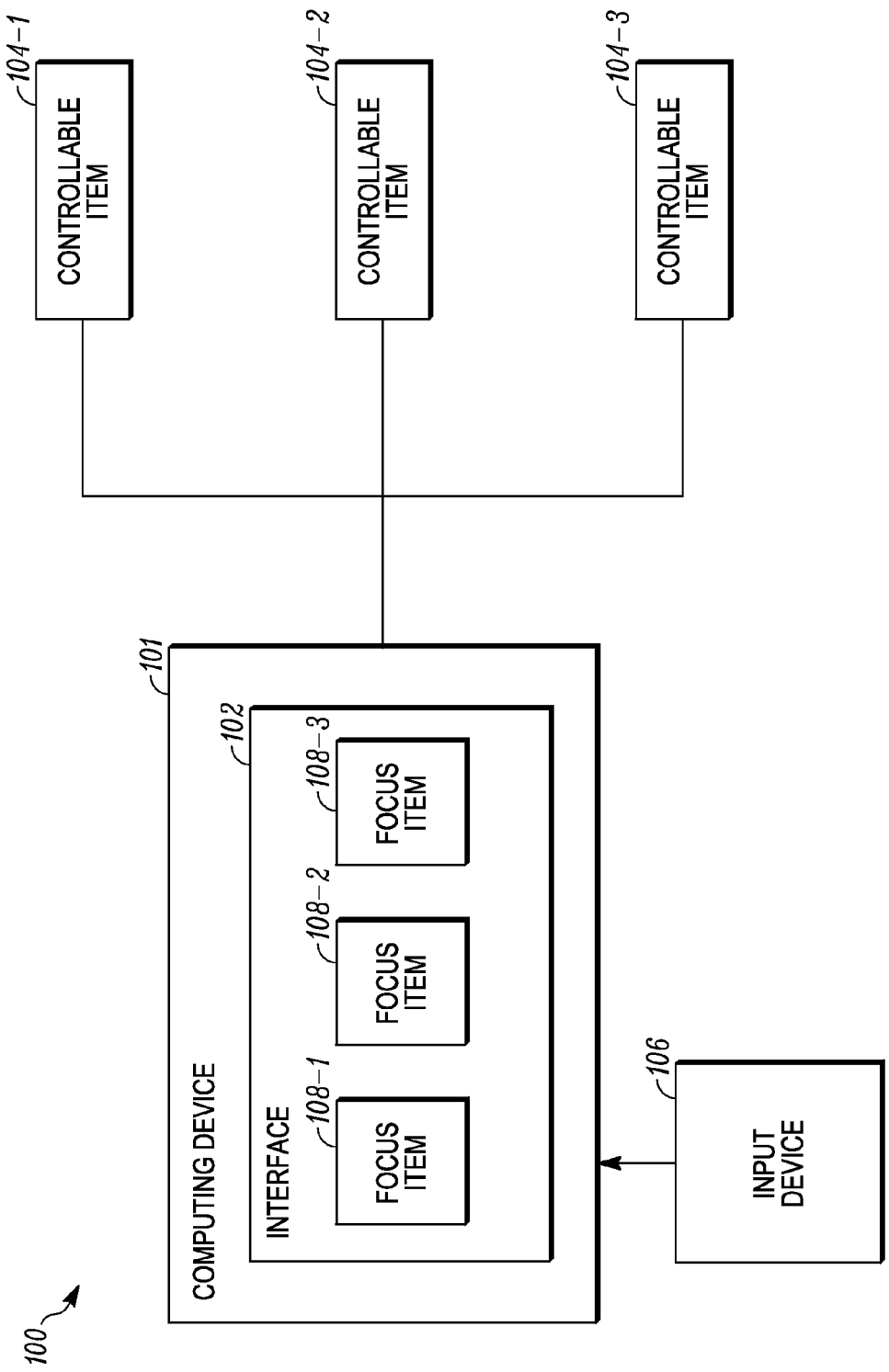
FIG. 1 depicts a simplified system for providing item control according to one embodiment.

FIG. 1 depicts a simplified system 100 for providing item control according to one embodiment. A computing device 101 includes an interface 102 that is used to control controllable items 104 based on input from an input device 106.

Focus items 108 may be associated with various controllable items 104. For example, focus item 108-1 is associated with controllable item 104-1; focus item 108-2 is associated with controllable item 104-2; and focus item 108-3 is associated with controllable item 104-3. Focus items 108 may visually indicate which controllable items 104 they are associated with, such as an icon for focus item 108-1 may show a picture of a thermostat such that a user can recognize that focus item 108-1 is associated with a physical thermostat.

Controllable items 104 may be any devices that are physical or virtual. For example, physical items may include thermostats, lights, locks, and other devices that may be found in a location, such as a user's home. Examples of virtual items include applications, content, music, and content feeds.

Controllable attributes may be aspects of controllable items 104 that can be automatically controlled. For example, interface 102 may be used to control controllable items 104. When an input is received at computing device 101, computing device 101 automatically controls controllable item 104. For example, a temperature on a thermostat may be set using interface 102.

Input device 106 may be any device that can be used to send signals to computing device 101. For example, input device 106 may include a remote control, a cellular phone, a laptop computer, a tablet computer, or any other device with a keyboard. In one embodiment, a keyboard of input device 106 includes navigation controls, such as up, down, right, and left controls. The controls may be actuated by a user using keystrokes, which may be a user "pressing" or "selecting" a key. Users may use keystrokes to navigate among focus items 108 in interface 102. Further, keystrokes may be used to navigate among controllable attributes for a focus item 108 in addition to other settings within each controllable attribute. In one embodiment, a touchscreen or mouse/pointer may not be used where a user is restricted to navigation using the keystrokes among controllable attributes and settings. However, a touchscreen and also a mouse/pointer may also be used in conjunction with keystrokes in other embodiments. Particular embodiments attempt to limit a number of keystrokes by dynamically arranging controllable attributes based on a context.

Particular embodiments determine focus on a focus item 108. The focus on focus item 108 may be determined using various indications. For example, the focus may be determined from objects, controls, display or screen areas, or other items, to which a user has directed his/her attention to focus item 108. Focus can be determined or assumed based on detecting that a user's attention is directed towards, or has changed to, a focus item 108. For example, focus can occur when a pointer rollover (i.e., mouse-over) on focus item 108 occurs, and a pointer sufficiently close to focus item 108, or when a user actually selects (e.g., clicks on) focus item 108. Additionally, a user may navigate to focus item 108 using keystrokes to select focus item 108. For example, a user may move a box to highlight focus item 108 and then select focus item 108 using an "enter" key on input device 106. If a touch screen is used, focus may be determined by a user touching the area on/around focus item 108.

Also, the focus may be determined in other ways, such as focus is determined based on an external event that occurs. For example, input device 106 may be pointed at controllable items 104 themselves. Optical recognition or codes may be used to determine which controllable item 104 is being focused on by input device 106. Also, when a temperature goes above a certain degree threshold, the focus may automatically change to a thermostat.

When focus is determined on a focus item 108, a context is determined. The context may provide meaning to the focus. The context that is determined may be based on information that is dynamically determined to help rank and prioritize controllable attributes for a controllable item 104. Context may be a combination of data points that relate to a given object. The relevance of a data point to a given object can be determined in any number of ways. In one embodiment, other data points of the same controllable item 104 can be used to determine the exposed interfaces, and the order of those interfaces. In a more complex embodiment, data points from other items, and other services, can be tagged as key to a given item type, or specific item. In this case, the context determination for that controllable item 104 is a combination of like "tagged" data points. In yet another embodiment, specific business rules are clearly defined for a given controllable item 104 or item type to determine how to display given the matrix of possible data point configurations.

The context may be information associated with controllable item 104 or from external sources. For example, a context for a thermostat may be an active mode in which the thermostat is operating (e.g., a heating mode). An external source may be a current temperature or time of day. Particular embodiments determine a set of controllable attributes for focus item 108.

The context may be used to determine the set of controllable attributes, but in some embodiments may not. If the context is used, the set of controllable attributes may be different based on the context. Then, an order to display the set of controllable attributes is dynamically determined based on the context. For example, if a user is in a different geographical area or it is determined to be a different time of the day, then an order of display for the controllable attributes may be adjusted.

The order of controllable attributes is adjusted to reduce a number of keystrokes that are needed to navigate among the controllable attributes. For example, a number of display positions may be available to display controllable attributes. The first display position may require a single keystroke to navigate to that position, the second display position may require two keystrokes to navigate to that position, etc. The order of the controllable attributes is determined such that controllable attributes that are determined to be most likely to be navigated to by a user are arranged in display positions that will require the fewest number of keystrokes to navigate to.

Figure 2:
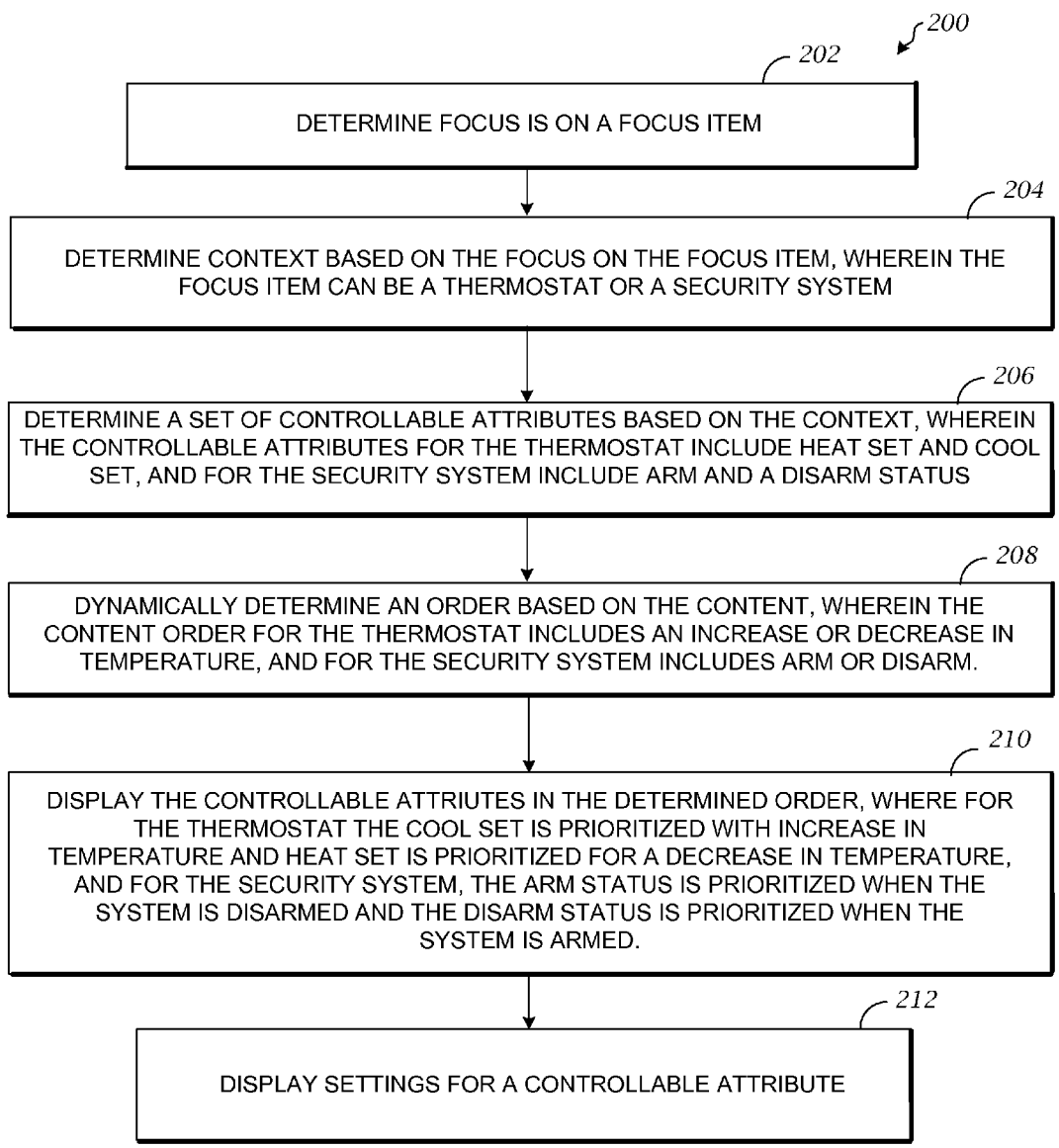
FIG. 2 depicts a simplified flowchart of a method for contextually arranging an order of controllable attributes according to one embodiment.

FIG. 2 depicts a simplified flowchart 200 of a method for contextually arranging an order of controllable attributes according to one embodiment. At 202, computing device 101 determines focus is on a focus item 108 for a controllable item 104. For example, a selection of focus item 108 may be received.

At 204, computing device 101 determines a context based on the focus on focus item 108. As described above, a context may be determined based upon information for a controllable item 104, such as a current mode for the thermostat. The context may also be determined based on external sources not related to controllable item 104, such as time, geographical position, weather conditions, etc.

At 206, computing device 101 determines a set of controllable attributes. For example, a subset of possible controllable attributes for controllable item 104 is determined based on the context. If controllable item 104 has a set of ten possible controllable attributes that can be displayed, a subset of the ten controllable attributes may be determined based on the context. For example, if a thermostat is set in a heating mode and the temperature is determined to be 50° F., then a subset of controllable attributes may be displayed, such as the mode and fan controllable attributes. A cooling set point controllable attribute may not be included in the set due to the context that the temperature is 50° F. and it is not likely that the cooling mode will be activated.

At 208, computing device 101 dynamically determines an order based upon the context. For example, the order of controllable attributes may be arranged in a way that anticipates which controllable attribute a user may want to select next. For example, if the temperature is determined to be "cold", then a heating controllable attribute may be arranged as being first in the order because it is more likely the user may want to turn the heat on when it is cold. In this way, if a user is using keystrokes to select controllable attributes, the number of keystrokes may be reduced for a user to select desired controllable attribute.

At 210, computing device 101 displays the controllable attributes in the determined order. For example, the controllable attributes are arranged in different display positions according to the order.

At 212, computing device 101 displays settings for a controllable attribute. For example, settings may be displayed for a single controllable attribute. However, settings may also be displayed for other controllable attributes. The settings may also be ordered based on context. For example, more important settings are displayed to reduce a number of keystrokes to navigate to more important settings. The setting allow for a user to set an aspect of the controllable attribute. For example, a temperature level may be set in a heating set point controllable attribute.

After displaying the set of controllable attributes, one of the controllable attributes may be selected. This may cause a new set of controllable attributes to be determined and arranged in an order. Also, if the set of controllable attributes remains the same, the existing set may be rearranged. A new context may be determined in either case and used to determine the set of controllable attributes and the order. Also, in some cases, the context remains the same.

Figure 3:
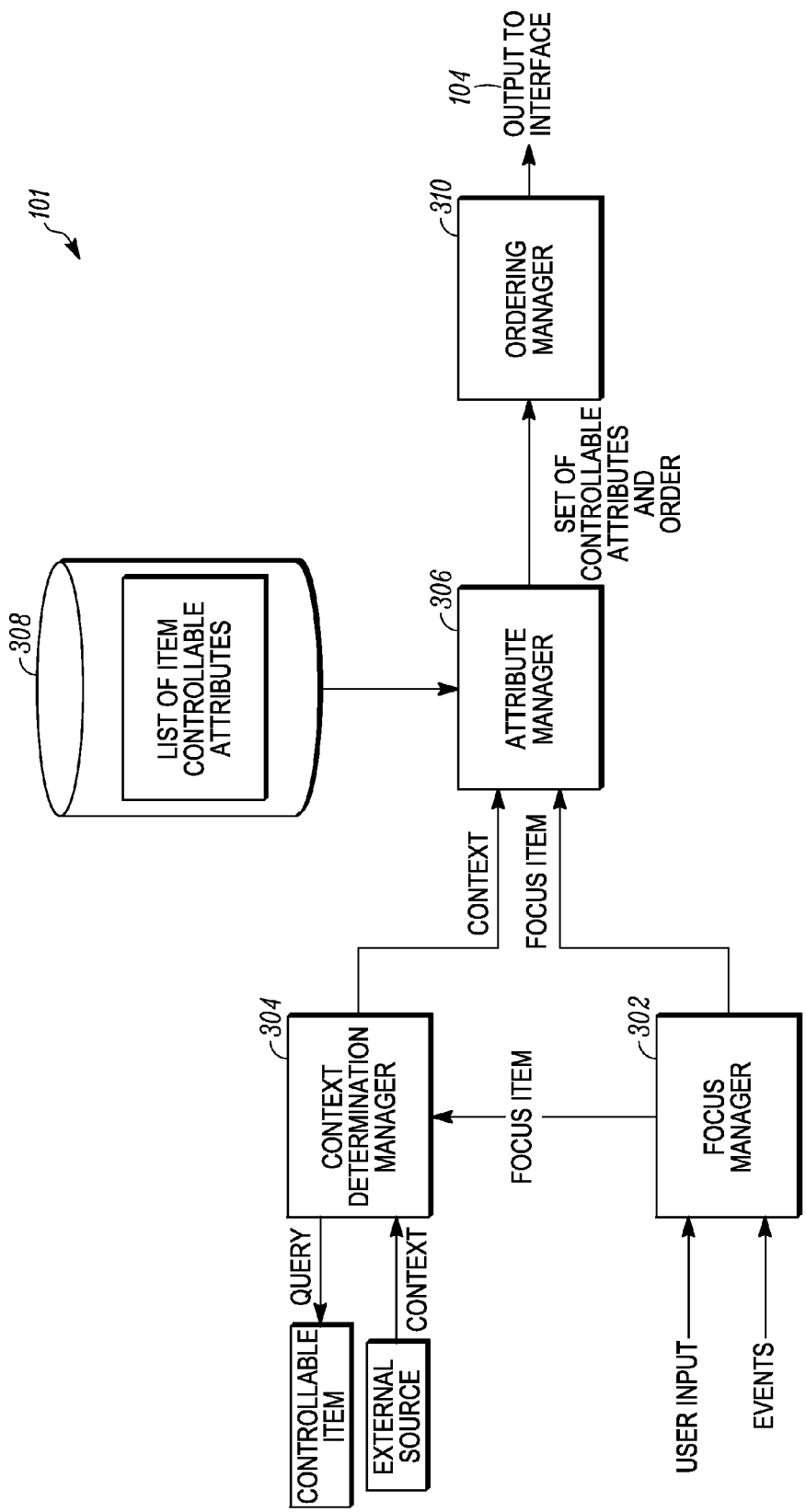
FIG. 3 depicts a more detailed example of a computing device according to one embodiment.

FIG. 3 depicts a more detailed example of computing device 101 according to one embodiment. A focus manager 302 detects when focus is on a focus item 108. For example, user input may be received from input device 106 and focus manager 302 determines when focus is on a specific focus item 108. In other examples, events may be received by focus manager 302 and are used to determine when focus is on a focus item 108. For example, input device 106 may be pointed at a physical item.

A context determination manager 304 determines a context. The context may be determined when focus item 108 is selected or when a controllable attribute for focus item 108 is selected. The context may be information associated with controllable item 104. In this case, a query may be sent to controllable item 104 for information. For example, context determination manager 304 may query for the active mode of controllable item 104. Also, a query may not be performed. For example, when the active mode for a controllable attribute is changed, the mode is stored. Additionally, external sources may be used to determine the context. For example, the time of day, weather, or other sources may be queried to determine the context.

The source used to determine the context may be based on different rules. For example, rules are evaluated to determine which context to use. In one example, a user may want to associate certain contexts with focus items 108, such as when focus is detected on a thermostat, a user may want to have the time of day and the mode of the thermostat used as the context.

Once the context is determined, an attribute manager 306 may use the context to determine a set of controllable attributes. The set of controllable attributes may be determined from a database 308 that stores lists of possible controllable attributes for various controllable items 104. Attribute manager 310 may query for all controllable attributes for the controllable item 104 associated with the selected focus item 108. Attribute manager 310 then determines a subset of the possible controllable attributes based on the context. The set may be limited based on a value of the context. For example, rules may be used to indicate that different modes of operation are associated with different sets of controllable attributes.

Once the set of controllable attributes is determined, an ordering manager 310 determines an order to display the set of attributes based on the context. For example, if certain display positions on interface 102 are provided, the ordering of controllable attributes in the display positions is based on the number of keystrokes that are required to navigate to the display positions. For example, a controllable attribute that is deemed most important is displayed in a first position that may require one keystroke to navigate to; then, a controllable attribute that is considered the second most important is displayed in a position that requires two keystrokes to navigate to, and so on. Ordering manager 308 then outputs the set of controllable attributes and the order to interface 108 for display.

Figure 4A:
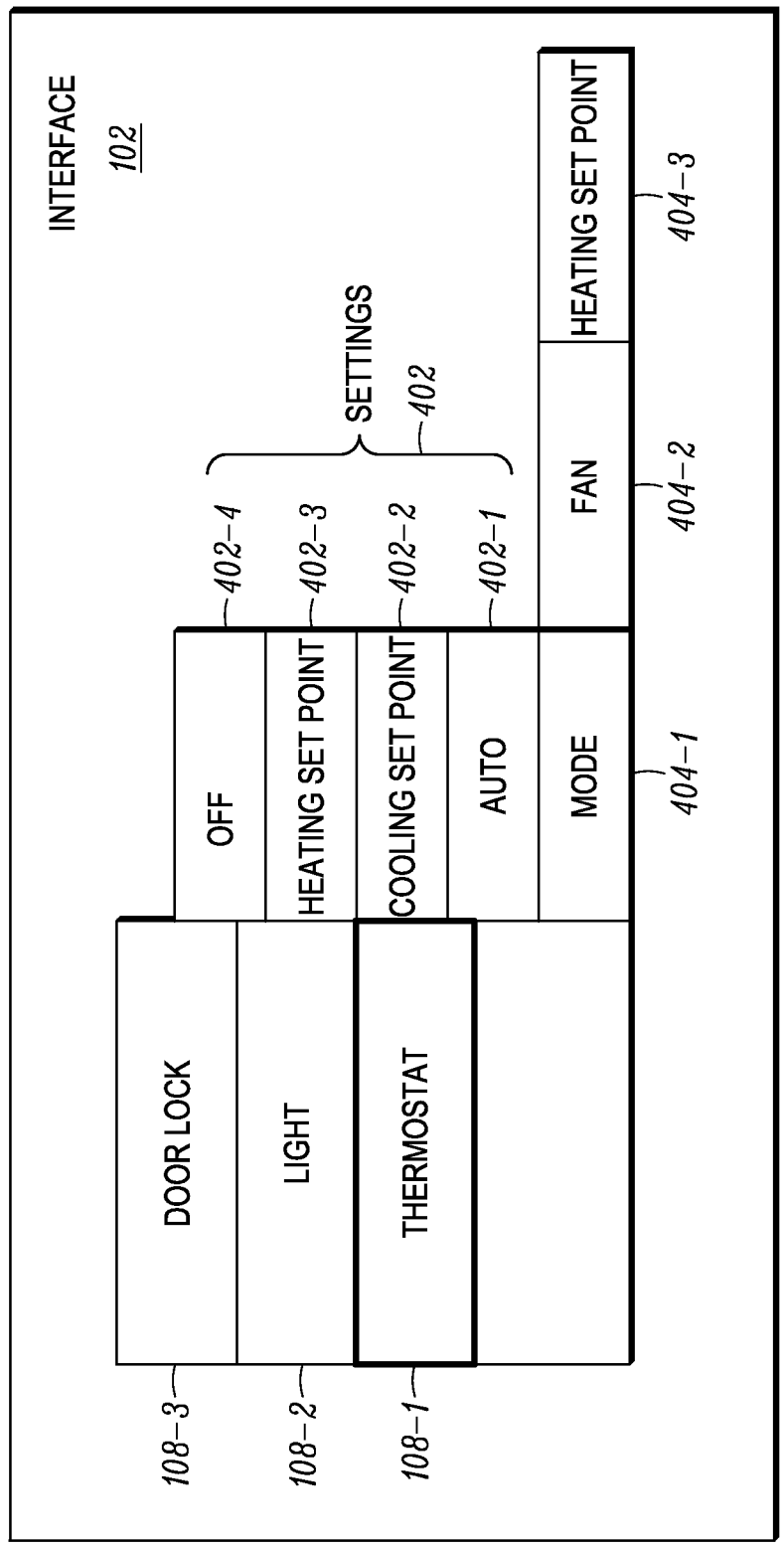
FIG. 4A depicts a more detailed example of an interface according to one embodiment.

FIG. 4A depicts a more detailed example of interface 102 according to one embodiment. Focus items 108-1, 108-2, and 108-3 correspond to controllable items 104-1, 104-2, and 104-3 of a thermostat, a light, and a door lock, respectively. Focus is on the thermostat. Controllable attributes #1, #2, and #3 have been displayed for a mode, a fan, and a heating set point. Also, settings 402 are displayed for a controllable attribute #1. For example, the settings include a setting 402-1 of auto, a setting 402-2 of cooling set point, a setting 402-3 of heating set point, and a setting 402-4 of off. These settings are actually other controllable attributes for the thermostat and can be selected to set the mode of the thermostat. Thus, settings 402 may allow for the setting of a value for the controllable attribute (e.g., set the heat to a temperature) or be used to select another controllable attribute (e.g., select the heating set point mode).

Navigation among the controllable attributes may be performed in the left and right directions in this example. For example, from focus item 108-1, user may navigate to the right with a single keystroke to a first display position 404-1 displaying controllable attribute #1. Then, with a second keystroke, a user may navigate to a second display position 404-2 displaying controllable attribute #2. A third keystroke navigates to a third display position 404-3 displaying controllable attribute #3. Additionally, navigation for settings 402 may be in the up and down directions. For example, a user may navigate from display position 404-1 into settings 402. An up keystroke may navigate to setting 402-1, and subsequent keystrokes navigate to settings 402-2, 402-3, and 402-4.

Figure 4B:
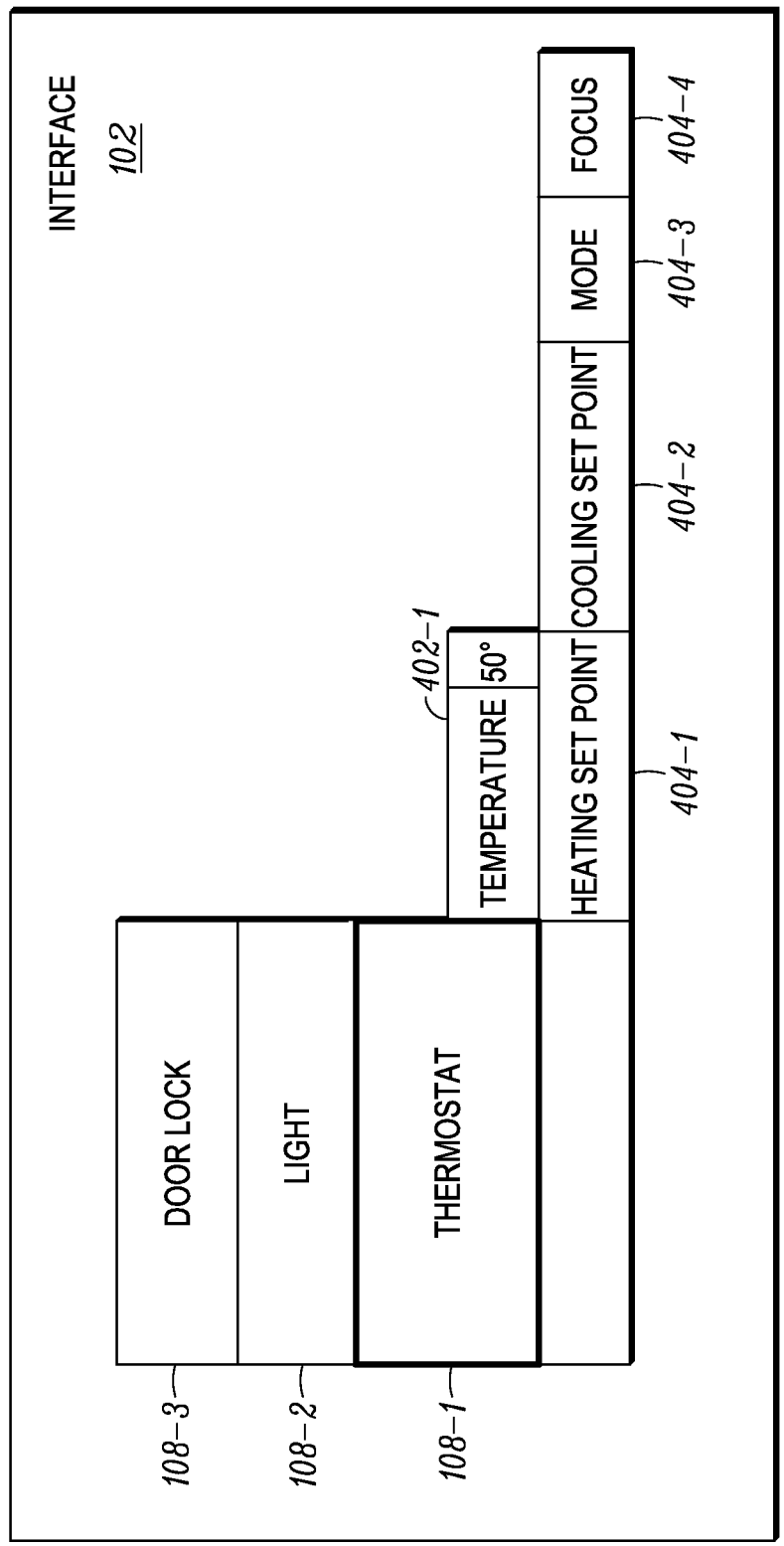
FIG. 4B shows another example of the interface after a new controllable attribute is selected according to one embodiment.

Controllable attributes in FIG. 4A may have been arranged in an order determined based on a context. Additionally, a user may select another controllable attribute/setting 402 and a different set of controllable attributes may be displayed or existing controllable attributes may be re-ordered. For example, FIG. 4B shows another example of interface 102 after a new controllable attribute is selected according to one embodiment. Focus is still on focus item 108-1; however, a controllable attribute of heating set point has been selected. A setting 402-1 allows a user to set the heating set point.

Also, a set of controllable attributes is determined to include heating set point, cooling set point, mode, and fan. The context that is used to determine the set is the active mode of the thermostat of heating set point. Also, the ordering that is shown is heating set point, cooling set point, mode, and fan. This ordering is different from the ordering shown in FIG. 4A, which included an ordering of the mode, fan, and heating set point. Thus, a new controllable attribute of cooling set point has been added and also, the ordering has been changed. For example, the ordering is changed such that cooling set point is located next to heating set point. In this case, a user would use the least amount of keystrokes to select cooling set point. This ordering may be used because it may be determined that the user may want to select cooling set point first.

Figure 4C:
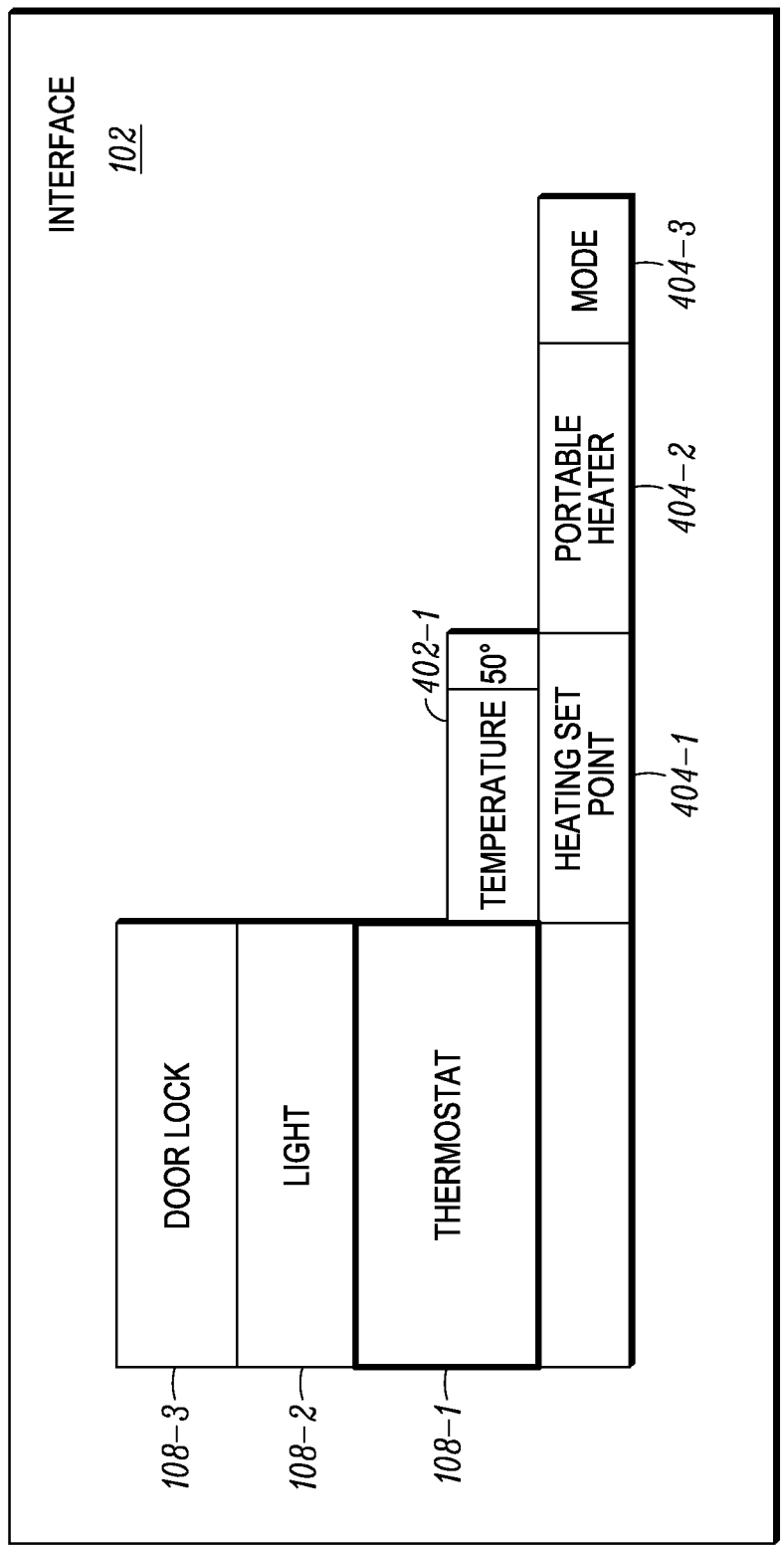
FIG. 4C shows an example of the interface when a different context is determined according to one embodiment.

FIG. 4C shows an example of interface 102 when a different context is determined according to one embodiment. For example, the heating set point may have been selected as was in FIG. 4B; however, the context used in this case is an outside temperature and not the active mode of the thermostat. For example, the outside temperature may indicate that it is cold outside. In this case, it may be highly unlikely that a user may select a cooling set point or a fan. Taking this context into account, the set of controllable attributes of heating set point, portable heater, and mode are determined. The portable heater controllable attribute may control a portable heater the user may want to turn on the due to the cold temperature outside. The ordering displays the portable heater in first display position 404-1 and then the mode controllable attribute in second display position 404-2. Accordingly, the controllable attributes displayed have been changed and also the order has been changed based on different contexts. This may reduce a number of keystrokes when navigating between controllable attributes. Also, if a touch screen or mouse input is also being used, then the user may be presented with a more organized user interface by providing only a subset of controllable attributes that are determined to be most relevant based on the context.

In another example using the thermostat, the controllable attributes for the thermostat are heating set point, cooling set point, mode, and fan. The thermostat's mode is set to a heating mode. When controllable attributes for the thermostat are displayed, the heating set point is the first controllable attribute displayed. The heating set point controllable attribute is followed by the fan, the mode, and cooling set point controllable attributes. When the mode of the thermostat is changed to "cool", the controllable attributes are re-ordered to cooling set point, fan, mode, and heating set point. When the mode is changed to off, then the only controllable attribute displayed is mode.

Additionally, when the mode attribute is changed to auto, the controllable attributes are re-ordered based on the current temperature and trend. For example, if the thermostat detected temperature has caused the heating mode of the system to activate where the temperature is below the heating set point, the re-ordering of the controllable attributes is heating set point, fan, cooling set point, and mode. If the thermostat detected temperature has caused the cooling mode to activate, then the re-ordering of the controllable attributes is cooling set point, fan, heating set point, and mode. If neither the cooling nor heating mode is activated, then the order will be based on the context of the trending of the temperature. For example, if the temperature is going down, then the heating set point will first be displayed followed by cooling set point, fan, and mode. In this case, it is expected that the user may want to turn on the heat because the temperature is going down. If the temperature is going up, the cooling set point is displayed first, followed by heating set point, fan, and mode. In this case, the context of the temperature going up is used to determine that the cooling set point may be most likely to be used first.

In another example, if focus is on focus item 108 of a security system, a controllable attribute may be an "arming" controllable attribute. The arming controllable attribute allows a user to turn the security system on. If the arming controllable attribute is armed, then the only controllable attribute displayed is "disarm", which allows a user to turn off the security system. If the security system is disarmed, then the controllable attribute displayed is the arming controllable attribute. Other contextual information may also be used to display the controllable attributes. For example, a video feed may be analyzed to determine whether to display an arming controllable attribute. In this case, when motion is detected on the video feed, the user is given the option to arm the security system.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method of comprising:
    determining focus on a focus item associated with a controllable item, the focus item being displayed on an interface that includes a plurality of display positions;
    determining a context for the controllable item based on the focus being on the focus item;
    determining a set of controllable attributes that are used to control attributes of the controllable item;
    dynamically, by a computing device, determining an order of the set of controllable attributes based on the context, wherein the context is used to prioritize the set of controllable attributes in the order; and
    displaying at least a portion of the set of controllable attributes in the order in at least a portion of the plurality of display positions, the at least a portion of the set of controllable attributes allowing control of the controllable item,
    wherein the controllable item is a thermostat,
    wherein the focus item comprises an icon on a display for the thermostat,
    wherein the controllable attribute comprises a list including heat set and cool set,
    wherein the context comprises an increase or decrease in ambient temperature, and
    wherein the heat set is prioritized and displayed at a higher priority with a decrease in temperature and wherein the cool set is prioritized and displayed at a higher priority with an increase in temperature.

2. The method of claim 1, wherein higher priority comprises first in a list.

3. A method of claim 1 comprising:
    determining focus on a focus item associated with a controllable item, the focus item being displayed on an interface that includes a plurality of display positions;
    determining a context for the controllable item based on the focus being on the focus item;
    determining a set of controllable attributes that are used to control attributes of the controllable item;

dynamically, by a computing device, determining an order of the set of controllable attributes based on the context, wherein the context is used to prioritize the set of controllable attributes in the order; and displaying at least a portion of the set of controllable attributes in the order in at least a portion of the plurality of display positions, the at least a portion of the set of controllable attributes allowing control of the controllable item, wherein the controllable item is a security system, wherein the focus item comprises an icon on a display for the security system, wherein the controllable attribute comprises an arm and a disarm status, wherein the context comprises whether the system is currently armed or disarmed, and wherein the arm status is prioritized and displayed at a higher priority when the context is disarmed and wherein the disarm status is prioritized and displayed at a higher priority when the context is armed.

4. A non-transitory computer-readable storage medium containing instructions for controlling a computer system to be operable to:

determine focus on a focus item associated with a controllable item, the focus item being displayed on an interface that includes a plurality of display positions;

determine a context for the controllable item based on the focus being on the focus item;

determine a set of controllable attributes that are used to control attributes of the controllable item;

dynamically determine an order of the set of controllable attributes based on the context, wherein the context is used to prioritize the set of controllable attributes in the order; and display at least a portion of the set of controllable attributes in the order in at least a portion of the plurality of display positions, the at least a portion of the set of controllable attributes allowing control of the controllable item.

wherein the controllable item is a thermostat, wherein the focus item comprises an icon on a display for the thermostat, wherein the controllable attribute comprises a list including heat set and cool set, wherein the context comprises an increase or decrease in ambient temperature, and wherein the heat set is prioritized and displayed at a higher priority with a decrease in temperature and wherein the cool set is prioritized and displayed at a higher priority with an increase in temperature.

5. The non-transitory computer-readable storage medium of claim 4, wherein the controllable item is a security system, wherein the focus item comprises an icon on a display for the security system, wherein the controllable attribute comprises an arm and a disarm status, wherein the context comprises whether the system is currently armed or disarmed, and wherein the arm status is prioritized and displayed at a higher priority when the context is disarmed and wherein the disarm status is prioritized and displayed at a higher priority when the context is armed.

\* \* \* \* \*